United States Patent [19]

Buer et al.

[11] Patent Number: 5,727,896
[45] Date of Patent: Mar. 17, 1998

[54] FORM-FITTED CONNECTION BETWEEN TWO ELEMENTS

[75] Inventors: Gerald Buer, Muhlhausen; Michael Beck, Rottenbach, both of Germany

[73] Assignee: Ina Walzlager Schaeffler KG, Germany

[21] Appl. No.: 721,499

[22] Filed: Sep. 26, 1996

[30] Foreign Application Priority Data

Nov. 15, 1995 [DE] Germany ............ 195 42 600.2

[51] Int. Cl.$^6$ ............... F16C 33/58; F16D 1/00
[52] U.S. Cl. ............... 403/24; 403/335; 403/348; 403/375; 384/622
[58] Field of Search ............... 403/348, 350, 403/335, 338, 364, 375, 334, 326, 24; 285/376, 401, 360; 384/622

[56] References Cited

U.S. PATENT DOCUMENTS

| | | | |
|---|---|---|---|
| 825,354 | 7/1906 | Schnoor | 285/360 X |
| 3,741,251 | 6/1973 | Rees | 403/364 X |
| 3,937,541 | 2/1976 | Alling et al. | 384/622 |
| 3,953,142 | 4/1976 | Price et al. | |
| 4,532,622 | 7/1985 | Newbold | 403/348 X |
| 4,688,833 | 8/1987 | Todd | 285/376 X |
| 5,025,709 | 6/1991 | Miyazaki | 403/348 X |
| 5,056,412 | 10/1991 | Gautier et al. | 403/348 X |
| 5,267,807 | 12/1993 | Biedermann et al. | 403/335 X |
| 5,335,998 | 8/1994 | Muntnky et al. | 384/622 |
| 5,417,511 | 5/1995 | Warden | 403/350 X |
| 5,466,020 | 11/1995 | Page et al. | 285/376 X |
| 5,647,675 | 7/1997 | Metten et al. | 384/622 X |

FOREIGN PATENT DOCUMENTS

| | | | |
|---|---|---|---|
| 2507900 | 8/1975 | Germany . | |
| 15180 | of 1885 | United Kingdom | 285/401 |

*Primary Examiner*—Harry C. Kim
*Attorney, Agent, or Firm*—Bierman, Muserlian and Lucas

[57] ABSTRACT

A form fitted connection between an angular disc of an axial bearing on a connecting element with the angular disc bearing against an end face of the connecting element with the angular disc comprising at least one retaining lug engaging into an associated recess in an outer peripheral surface of the connecting element.

2 Claims, 2 Drawing Sheets

FORM-FITTED CONNECTION BETWEEN TWO ELEMENTS

FIELD OF THE INVENTION

The invention concerns a form-fitted connection between a connecting element and an annular element, said annular element comprising at least one retaining lug which engages into an associated recess in the outer peripheral surface of the connecting element.

BACKGROUND OF THE INVENTION

Form-fitted connections between a connecting element and an annular element are known from DE 25 07 900 C2 which shows several embodiments of an axial rolling bearing which comprises a bearing disc which is retained on a connecting element by a ring. The ring comprises retaining lugs which engage into a recess in the outer peripheral surface of the connecting element. A drawback of this prior art is that there is no firm axial fixing between the element to be retained and the connecting element. Moreover, in the case of the recess being made in the form of a circumferential groove, there exists the danger of a relative rotation between the two elements.

OBJECTS OF THE INVENTION

It is an object of the invention to improve the generic type of connection between two elements so that the known drawbacks are avoided.

This and other objects and advantages will become obvious from the following detailed description.

SUMMARY OF THE INVENTION

The form-fitted connection of the invention between a connecting element (5) and an annular element, said annular element comprising at least one retaining lug (4) which engages into an associated recess (6) in an outer peripheral surface of the connecting element (5), is characterized in that the recess (6) starts from a summit point and extends in peripheral direction towards an end face of the connecting element (5) facing away from the annular element so that an axial distance (7) between the recess (6) and an end face of the connecting element (5) facing the annular element increases in peripheral direction.

Because the recess starts from a summit point and extends in peripheral direction towards an end face of the connecting element facing away from the annular element, an axial distance which increases in peripheral direction is provided between the recess and an end face of the connecting element facing the annular element increases in peripheral direction.

The retaining lugs of the annular element which is to be fixed are pushed back elastically when the annular element is pushed onto the connecting element and they snap into the recess in the outer peripheral surface of the connecting element, thus establishing the desired connection between the two elements. In case of a relative rotation between the connecting element and the annular element, the retaining lugs move along the contour of the recess and thus assure a firm axial retention between the two elements, it being inconsequential whether the rotation between the connecting element and the annular element is in clockwise or in anti-clockwise direction. The relative rotation between the two elements can take place in both directions only to a defined limited extent along the periphery. When the two elements bear firmly against each other in axial direction, the retaining lug likewise bears firmly against the recess so that the system acts as an anti-rotation device.

According to a further feature of the invention, the recess as seen in a peripheral direction, has the shape of a circular ring or of an ellipse, or is roof-shaped. Depending on the shape of the contour of the recess in each case, the axial clearance between the two elements is overcome rapidly or less rapidly for the same angle of rotation between the connecting element and the annular element. However, it is important that the angle that determines the shape of the recess in the direction of the end face facing away from the annular part is selected so that a self-locking action is obtained in peripheral direction when the two elements are not under load i.e., the position of the fixed annular element, once fixed, should be able to change only under load.

Finally, according to another feature of the invention, the annular element is configured as an angular disc arranged on the connecting element, and the radially extending surface of this angular disc serves as a rolling raceway for an axial bearing in an automatic transmission. If, in certain operational states of the automatic transmission, the so-called "shaft-locating washer" lifts off in axial direction from the rolling elements, the connection of the invention between the angular disc and the connecting element assures that the angular disc does not change its position, and an oil flow is prevented by the fact that the two elements bear firmly against each other in axial direction.

DETAILED DESCRIPTION OF THE DRAWINGS

Figure 1:
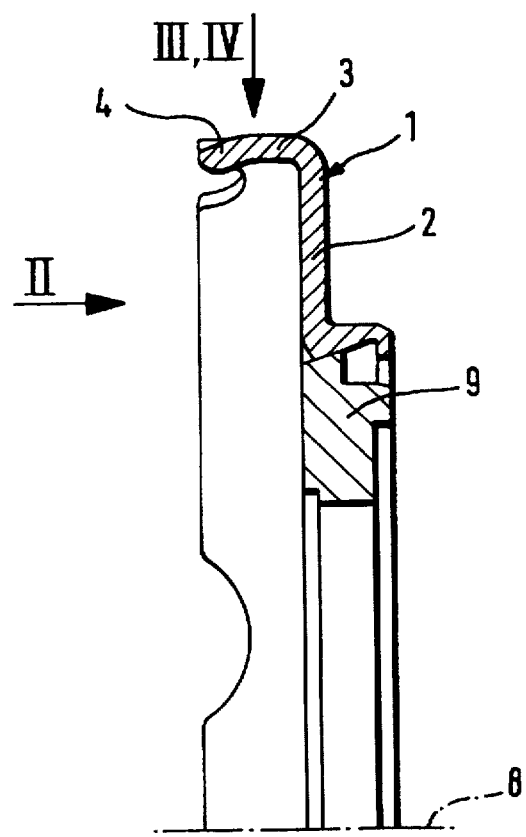
FIG. 1 is a side view of an angular disc shown partly in cross-section.
Figure 2:
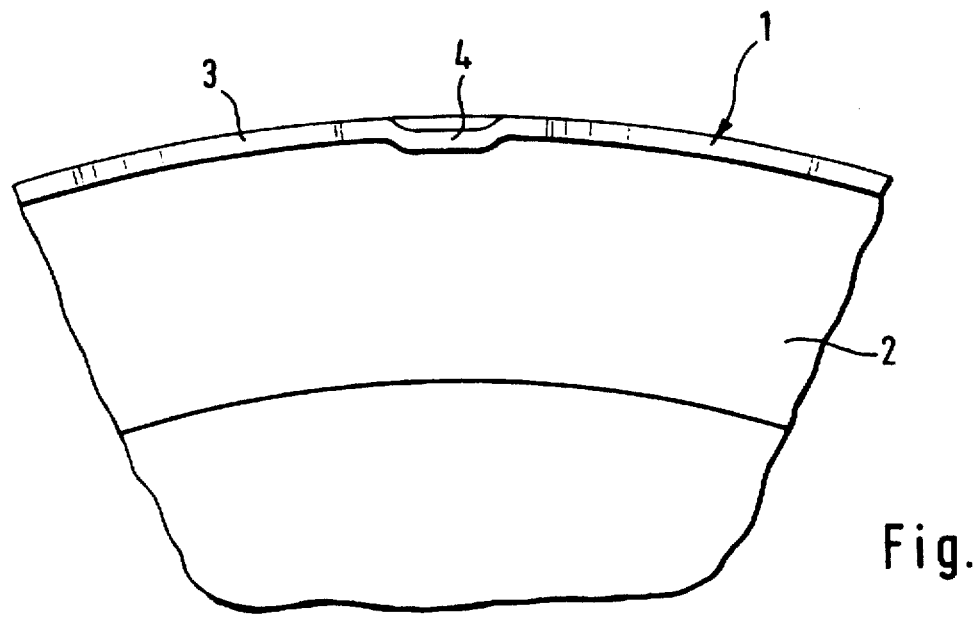
FIG. 2 is a partial top view of the angular disc of FIG. 1 following the direction of the arrow of FIG. 1.

The angular disc 1 shown in FIGS. 1 to 4 comprises a flat portion 2 extending vertically of the central axis 8, and a flange 3 which is parallel to the central axis 8. The flat portion 2 forms a raceway for a cage and rolling element assembly not shown. The axially extending flange 3 comprises retaining lugs 4 spaced uniformly over its circumference which engage into recesses 6 arranged on the outer peripheral surface of the connecting element 5. These retaining lugs 4 are configured so as to overlap the periphery of the connecting element 5 i.e., the radius of the angular disc 1 formed by the retaining lugs 4 is slightly smaller that the radius formed by the periphery of the connecting element 5. When the angular disc 1 is pushed onto the connecting element 5, the retaining lugs 4 are pushed elastically outwards in radial direction and then snap into the recesses 6 of the connecting element 5.

Figure 3:
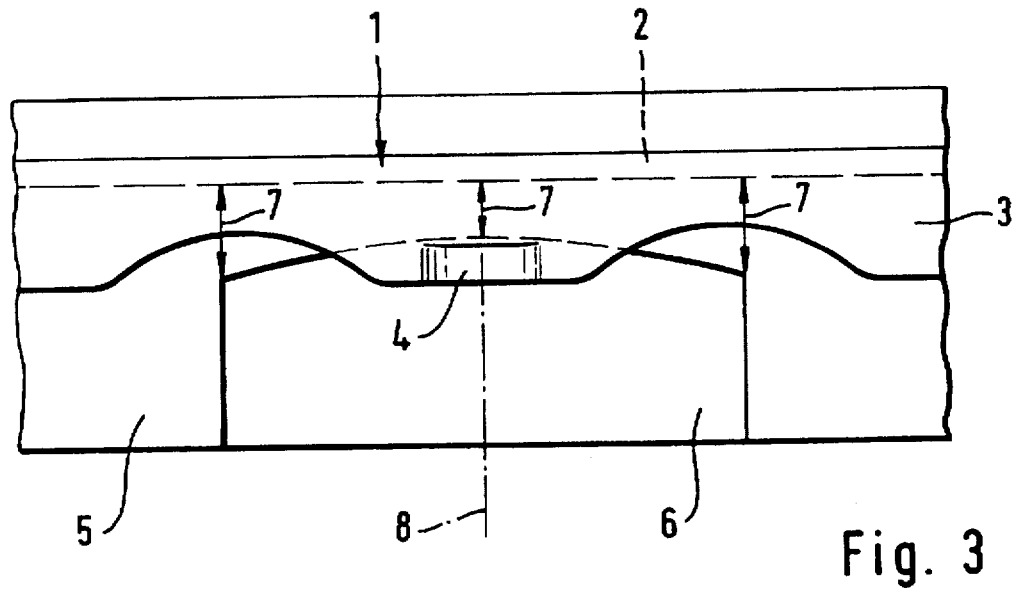
FIGS. 3 and 4 are partial top views of the angular disc and the connecting element of FIG. 1 following the direction of the arrow of FIG. 1.
Figure 4:
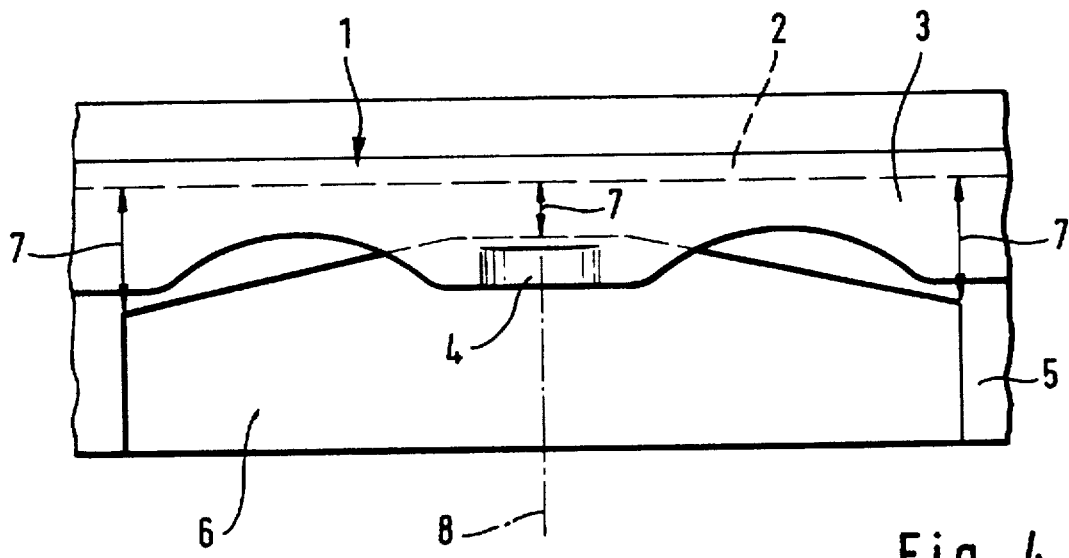

As can be seen in FIGS. 3 and 4, the recesses 6 of the connecting element 5 extend towards the end face thereof facing away from the annular element so that their axial distance 7 from an end face of the connecting element 5 facing the angular disc 1 has a varying dimension in peripheral direction. When the retaining lug 4 has snapped into the recess 6 in the region of the smallest axial distance 7, the retaining lug 4 follows the contour of the recess 6 during a relative rotation between the angular disc 1 and the connecting element 5. It will be readily appreciated that the two elements 1 and 5 get pressed firmly against each other in axial direction when such a relative rotation takes place. In this way, due to the self-locking effect thus obtained, a flow of oil between the connecting element 5 and the angular disc 1 is not possible, both in the loaded and in the unloaded state of the axial bearing. The split ring 9 arranged within the angular disc 1 also serves the same purpose. Moreover, the described shape of the recesses 6 assures that the angular disc 1 and the connecting element 5 can be displaced relative to each other only through a defined angle along the periphery so that the recesses 6 serve at the same time as an anti-rotation device.

The recesses 6 of FIGS. 3 and 4 differ from each other in that those of FIG. 3 have the shape of a circular ring or of an ellipse while those of FIG. 4 are roof-shaped i.e., starting from a summit point, they follow a declining curve in both peripheral directions.

Various modifications of the form-fitted connection of the invention may be made without departing from the spirit or scope thereof and it is to be understood that the invention is intended to be limited only as defined in the appended claims.

What is claimed is:

1. A form-fitted connection between an angular disc (1) of an axial bearing and a connecting element (5), the angular disc (1) bearing against an end face of the connecting element (5), the angular disc (1) comprising at least one retaining lug (4) which engages into an associated recess (6) in an outer peripheral surface of the connecting element (5), characterized in that the recess (6) has a shape of a circular ring or of an ellipse or is roof-shaped and starts from a summit point to extend in peripheral direction so that an axial distance (7) between the recess (6) and the angular disc (1) increases in both peripheral directions.

2. A form-fitted connection of claim 1 wherein the axial bearing is adapted to be arranged in an automatic transmission.

* * * * *